W. L. SMITH.
RACK OR TRAY FOR DENTAL AND LIKE INSTRUMENTS.
APPLICATION FILED AUG. 28, 1908.
935,420.
Patented Sept. 28, 1909.
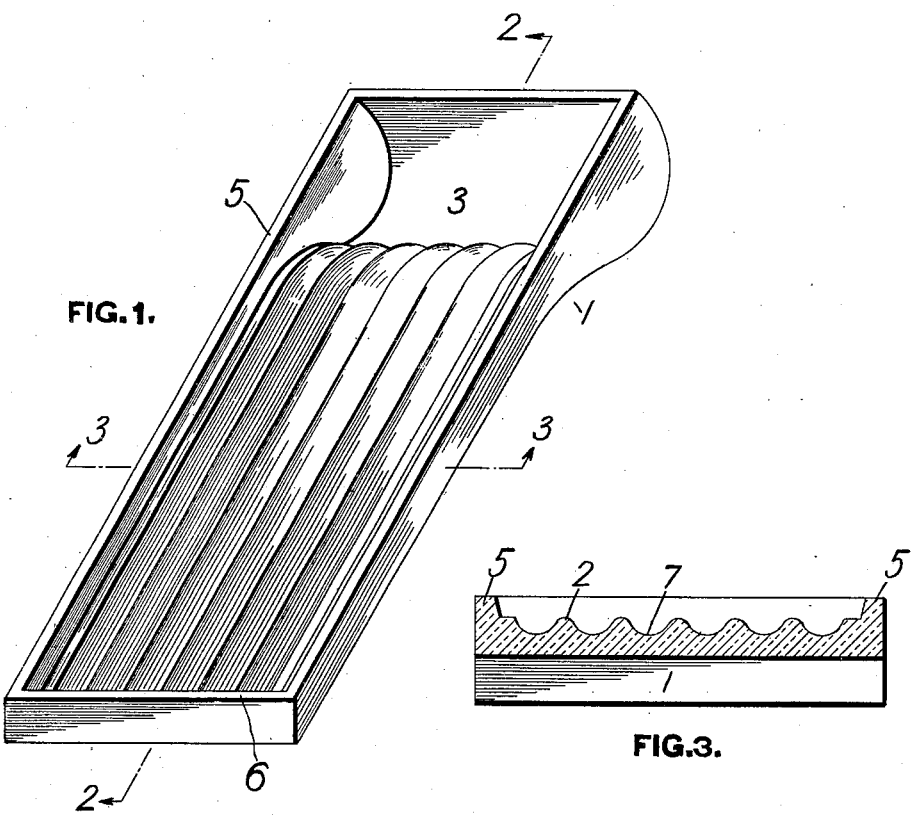
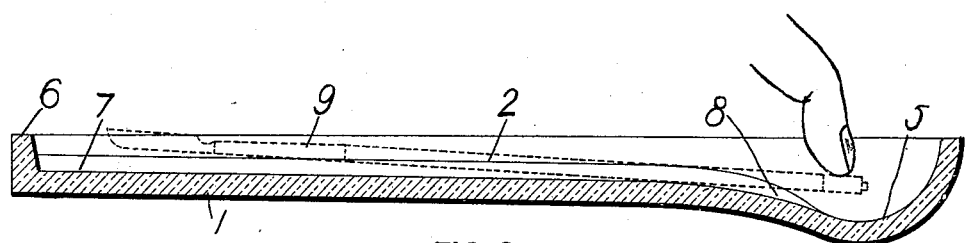
WITNESSES
Chas. Fosterman
Marie Draper
INVENTOR
Wesley Sinford Smith
By Frank W. Winter
His Attorney

UNITED STATES PATENT OFFICE.

WESLEY LINFORD SMITH, OF PITTSBURG, PENNSYLVANIA.

RACK OR TRAY FOR DENTAL AND LIKE INSTRUMENTS.

935,420.　　　　　Specification of Letters Patent.　Patented Sept. 28, 1909.

Application filed August 28, 1908. Serial No. 450,764.

*To all whom it may concern:*

Be it known that I, WESLEY LINFORD SMITH, a resident of Pittsburg, in the county of Allegheny and State of Pennsylvania, have invented a new and useful Improvement in Racks or Trays for Dental and Like Instruments, of which the following is a specification.

This invention relates to a rack or tray for holding small instruments such as used by dentists, surgeons and the like.

The object of the invention is to provide a rack or tray for this purpose which is convenient to use, that is, from which instruments can be easily picked up, and one which is entirely germ-proof and capable of being subjected to any kind of antiseptic treatment to render the device entirely sanitary.

Generally stated, the device comprises a rack or tray formed of germ-proof material, preferably a vitreous material, such as glass or porcelain, and provided with an inclined instrument receiving surface having therein grooves for the instruments, and with a cavity or depression at the upper end of said surface over which the ends of the instrument project, the grooves also preferably extending down into said cavity or depression.

In the accompanying drawings Figure 1 is a perspective view of my improved rack or tray; Fig. 2 is a longitudinal section on the line 2—2 Fig. 1; and Fig. 3 is a cross section on the line 3—3 Fig. 1.

The rack or tray comprises a suitable body 1, provided with a surface 2, inclined upwardly from one end of the rack to the opposite end thereof. At its upper end the rack is provided with a transverse concave or depressed portion 3, extending entirely across the same and having its bottom considerably below the surface 2. The bottom of the rack preferably will be formed to conform somewhat to the top surface, so that the rack rests only on its lower end and the bottom of the depressed portion 3. However, if desired, the lower face may be flat, in which event the rack will be somewhat heavier than if constructed as shown.

The surface 2, is surrounded by a suitable wall or barrier, consisting of side walls 5, and lower end wall 6. Formed in the surface 2, are a series of grooves 7, extending from the lower to the higher end of said surface, and also preferably extending down into the curved bottom of the depression 3, as shown at 8. These grooves are adapted to receive the tools or instruments 9, with the ends of said instruments projecting over the depression.

To pick up an instrument a finger is placed on the projecting end of the instrument and the latter is pressed down into the depression 3. This tilts the lower end of the instrument upwardly, and the groove 8, in the depression 3, guides the instrument and prevents the same from swinging sidewise, but causes the same to swing upward in a vertical plane and directly into the hand of the user. Consequently the rack is very convenient to use as any one instrument can be quickly and readily picked out of the same without disturbing the other instruments.

The rack is formed of some suitable germ-proof material which can be thoroughly sterilized, such as by boiling and the like. Preferably it is constructed of vitreous substance such as glass or porcelain having a highly vitreous surface. It may, if desired, be made of metal coated with a vitreous enamel.

What I claim is:

1. A rack for dental and similar tools and instruments comprising a tray having its bottom provided with uninterrupted longitudinal grooves for receiving the instruments and having at one end a wide depression transverse to the grooves and much deeper than said grooves, said bottom curving downwardly to form said depression, whereby an instrument can be recovered by pressing its overhanging end into said depression.

2. A rack for dental and similar tools and instruments comprising a tray having its bottom provided with longitudinal grooves for receiving instruments, and having at one end a depression transverse to the grooves and much deeper than said grooves, the grooves extending down into said depression.

In testimony whereof, I have hereunto set my hand.

WESLEY LINFORD SMITH.

Witnesses:
　WILLIAM I. KING,
　F. W. WINTER.